United States Patent
Flehmig et al.

(10) Patent No.: US 10,427,674 B2
(45) Date of Patent: Oct. 1, 2019

(54) EVASION AND BRAKE-ASSIST SYSTEM FOR MOTOR VEHICLES

(71) Applicant: Robert Bosch GmbH, Stuttgart (DE)

(72) Inventors: Folko Flehmig, Stuttgart (DE); Christian Braeuchle, Yokohama (JP)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 14/900,035

(22) PCT Filed: May 19, 2014

(86) PCT No.: PCT/EP2014/060240
§ 371 (c)(1),
(2) Date: Dec. 18, 2015

(87) PCT Pub. No.: WO2014/202309
PCT Pub. Date: Dec. 24, 2014

(65) Prior Publication Data
US 2016/0159327 A1    Jun. 9, 2016

(30) Foreign Application Priority Data
Jun. 20, 2013 (DE) .......................... 10 2013 211 643

(51) Int. Cl.
*B60W 30/09* (2012.01)
*B60T 7/22* (2006.01)
(Continued)

(52) U.S. Cl.
CPC .............. *B60W 30/09* (2013.01); *B60T 7/22* (2013.01); *B60T 8/17558* (2013.01);
(Continued)

(58) Field of Classification Search
CPC ....... B60T 7/22; B62D 15/0265; B60W 30/09
See application file for complete search history.

(56) References Cited

U.S. PATENT DOCUMENTS

| | | | |
|---|---|---|---|
| 2003/0067219 A1* | 4/2003 | Seto .......................... | B60T 7/22 303/193 |
| 2009/0222166 A1* | 9/2009 | Arbitmann ............ | B60W 10/06 701/41 |
| 2010/0063736 A1 | 3/2010 | Hoetzer | |
| 2010/0217486 A1* | 8/2010 | Taguchi .................. | B60T 7/042 701/41 |

(Continued)

FOREIGN PATENT DOCUMENTS

| | | |
|---|---|---|
| EP | 1 300 275 | 4/2003 |
| EP | 1 926 646 | 6/2008 |

(Continued)

*Primary Examiner* — Jelani A Smith
*Assistant Examiner* — Donald J Wallace
(74) *Attorney, Agent, or Firm* — Norton Rose Fulbright US LLP; Gerard Messina

(57) ABSTRACT

An evasion and brake-assist system for motor vehicles, having a sensory system for sensing the traffic environment of the vehicle, an actuator system for interventions in a steering system and a brake system of the vehicle, and having an electronic control device in which an emergency evasion function is implemented that checks whether an emergency evasive maneuver is necessary based on the data supplied by the sensory system and then acts on the dynamics of the vehicle via the actuator system to assist the vehicle driver in initiating and/or executing the emergency evasive maneuver, characterized in that in the first phase of an evasive maneuver, the emergency evasion function intervenes exclusively in the transverse dynamics, and only after this phase, decides whether an intervention in the longitudinal dynamics will also take place.

9 Claims, 3 Drawing Sheets

(51) Int. Cl.
*B62D 15/02* (2006.01)
*G08G 1/16* (2006.01)
*B60T 8/1755* (2006.01)
*B60W 10/184* (2012.01)
*B60W 10/20* (2006.01)
*B60W 50/00* (2006.01)

(52) U.S. Cl.
CPC .......... *B60W 10/184* (2013.01); *B60W 10/20* (2013.01); *B62D 15/0265* (2013.01); *G08G 1/16* (2013.01); *B60T 2201/022* (2013.01); *B60W 2050/0094* (2013.01); *B60W 2520/125* (2013.01); *B60W 2520/14* (2013.01); *B60W 2520/20* (2013.01); *B60W 2520/28* (2013.01); *B60W 2540/18* (2013.01)

(56) References Cited

U.S. PATENT DOCUMENTS

| | | | |
|---|---|---|---|
| 2011/0082623 | A1 | 4/2011 | Lu et al. |
| 2012/0323477 | A1 | 12/2012 | Flehmig |
| 2013/0030651 | A1 | 1/2013 | Moshchuk et al. |
| 2014/0229069 | A1* | 8/2014 | Akiyama ................ B60T 7/12 701/41 |
| 2014/0288785 | A1* | 9/2014 | Bretzigheimer .... B60T 8/17558 701/48 |

FOREIGN PATENT DOCUMENTS

| | | |
|---|---|---|
| JP | 2000159077 A | 6/2000 |
| JP | 2009 096349 | 5/2009 |
| JP | 2010179843 A | 8/2010 |

\* cited by examiner

EVASION AND BRAKE-ASSIST SYSTEM FOR MOTOR VEHICLES

FIELD OF THE INVENTION

The present invention relates to an evasion and brake-assist system for motor vehicles, having a sensory system for sensing the traffic environment of the vehicle, an actuator system for interventions in a steering system and a brake system of the vehicle, and having an electronic control device in which an emergency evasion function is implemented that checks whether an emergency evasive maneuver is necessary based on the data supplied by the sensory system, and then acts on the dynamics of the vehicle via the actuator system in order to assist the vehicle driver in initiating and/or executing the emergency evasive maneuver.

BACKGROUND INFORMATION

In newer-generation vehicles, assist functions are available that assess the danger situation based on a driving environment sensor system such as radar or video camera, and if an acute danger of collision is determined, become active in order to avoid accidents or at least to reduce the accident severity.

Some of these assist functions give haptic recommendations for action to the driver. Assist functions are also known which actively assist the driver by intervening in the driving dynamics, e.g., by automatically initiating an emergency braking and/or initiating an evasive maneuver by intervening in the steering system. For example, EP 1 926 646 B1 describes a system in which an evasion trajectory is planned and then implemented via a vehicle dynamics controller. However, for safety reasons, these evasion functions (evasion-assist systems) must be able to be overridden at any time by the driver.

SUMMARY OF THE INVENTION

An object of the present invention is to provide an evasion and brake-assist system, with which an evasive maneuver may be carried out more safely.

This objective is achieved in that in a first phase of an evasive maneuver, the emergency evasion function intervenes exclusively in the transverse dynamics, and only after this phase, decides whether an intervention in the longitudinal dynamics will also take place.

The invention takes into account the fact that many vehicle drivers during an emergency braking, whether initiated now by the drivers themselves or by the assist system, instinctively attempt to suppress transverse movements of the vehicle by corresponding countersteering, because they fear the vehicle will get out of control. Therefore, in the case of a combined evasion and brake-assist system, there is the danger that the systematic automatic execution of the evasive maneuver will be impeded or thwarted owing to such countersteering by the vehicle driver. That is why according to the present invention, in a first phase, an intervention takes place exclusively in the transverse dynamics without already initiating an emergency braking. It is thereby signaled to the driver that the evasion-assist system is active, and is carrying out an evasive maneuver with intervention in the transverse dynamics. In most cases, the vehicle driver will then accept or even actively back up this automatically initiated intervention, and will no longer countersteer when, if necessary, an intervention in the longitudinal dynamics, thus, a braking action then also takes place somewhat later.

In this way, there is greater probability that all in all, the maneuver can be carried out successfully.

Advantageous embodiments and refinements of the present invention are derived from the further descriptions herein.

The intervention in the transverse dynamics may be accomplished via the vehicle steering system, e.g., via an actuator which, in addition to the steering torque exerted manually by the driver, exerts a further steering torque on the steering shaft, or perhaps via a so-called active steering system that actively sets a steering angle, which then superposes with the steering angle adjusted manually by the driver via the steering wheel.

Alternatively or additionally, the intervention in the transverse dynamics may also be accomplished via the braking system, namely, by inducing a transverse movement of the vehicle through asymmetrical braking of at least one of the left and right vehicle wheels.

As a rule, the first phase of the evasive maneuver is followed by a second phase in which the emergency evasion function intervenes both in the transverse dynamics and in the longitudinal dynamics of the vehicle. However, depending upon the progression of the first phase, situations are also conceivable in which the emergency evasion function recognizes that it is no longer necessary to intervene in the longitudinal dynamics and therefore concludes the evasive maneuver solely by intervention in the transverse dynamics. Conversely, situations are likewise conceivable in which the intervention in the transverse dynamics is concluded or broken off before the intervention in the longitudinal dynamics has ended.

Additionally, indications to the vehicle driver are, of course, also possible prior to, during or after completion of the automatically initiated maneuver.

An exemplary embodiment is explained in greater detail below with reference to the drawings.

DETAILED DESCRIPTION

Figure 1:
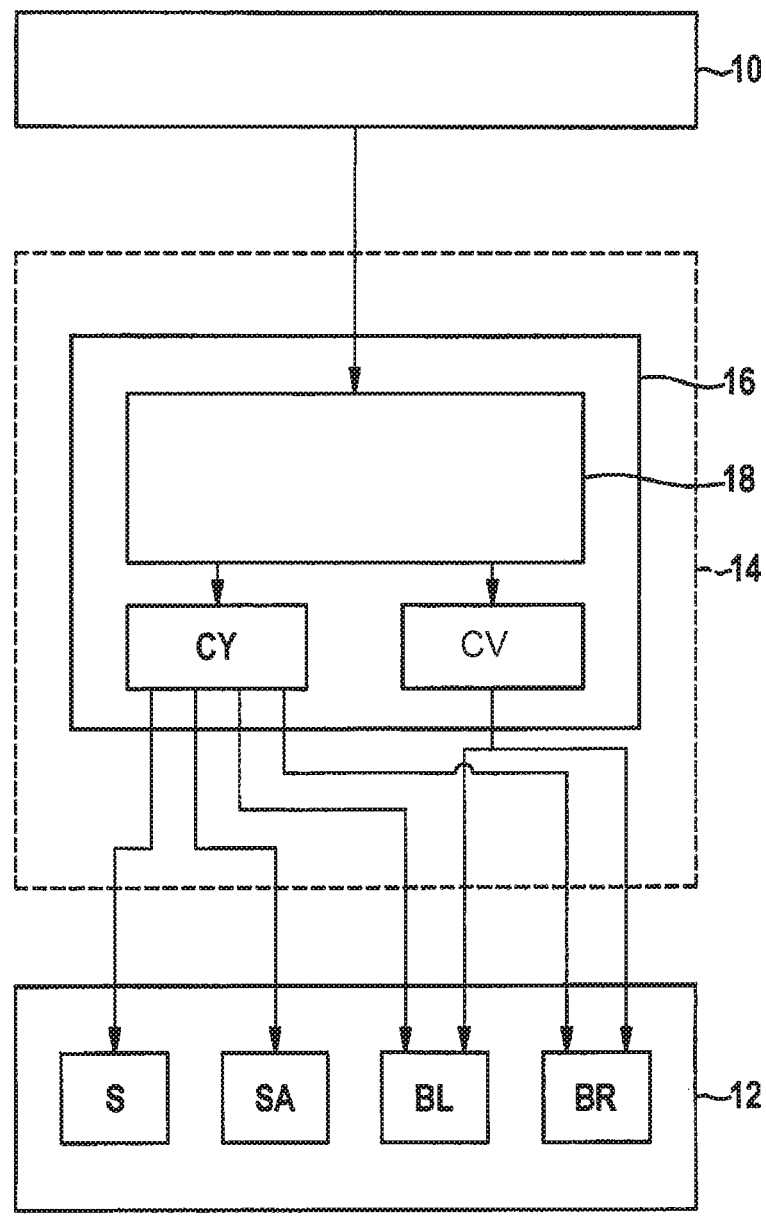
FIG. 1 shows a block diagram of an evasion-assist system according to the present invention.

The evasion-assist system shown as a block diagram in FIG. 1 includes a sensory system 10, an actuator system 12 and an electronic control device 14, e.g., in the form of one or more microprocessors, which evaluates and processes the data supplied by sensory system 10 and outputs commands as the result of this processing to actuator system 12.

On one hand, sensory system 10 includes sensor components that detect the dynamic state of the host vehicle, thus, for example, its velocity, acceleration, steering wheel angular velocity, yaw velocity, transmission state, slip of the drive wheels and the like. In addition, sensory system 10 includes sensor components that sense the environment of the vehicle, e.g., video systems having associated electronic image processing, radar sensors, ultrasonic sensors and the like. In the broader sense, information sources may also be counted as part of sensory system 10, which provide information about the traffic environment and especially the traffic infrastructure in another manner, e.g., data of a navigation system or of stored maps.

Implemented in control device 14 is an emergency evasion function 16 that assesses the instantaneous traffic situation in known manner based on the data supplied by sensory system 10 and calculates a probability for the occurrence of a collision with another vehicle or other obstacle. If this probability reaches a specific value, emergency evasion function 16 outputs commands to actuator system 12 in order to trigger an emergency evasive maneuver, e.g., initially by appropriate instructions to the driver, but if need be, also by active intervention in the dynamics of the vehicle.

Actuator system 12 includes a steering actuator S that, for example, generates a steering torque which acts on the steering shaft of the vehicle in addition to the steering torque exerted by the vehicle driver. Since the torque exerted by the steering actuator is limited in both directions by limiting values, the driver is able to override the steering intervention brought about by actuator system 12 by exerting his/her own steering torque (in the same direction or in an opposite direction) by hand via the steering wheel.

Alternatively or additionally, the actuator system may also have what is referred to as an active steering system SA, which sets a steering angle independently of the position of the steering wheel. An angle which corresponds to a superposition of the steering angle set by actuator system 12 and the steering angle adjusted manually by the vehicle driver via the steering wheel then ultimately results as the steering angle of the vehicle wheels. In this case, the driver is thus able to override actuator system 12 by setting a larger or smaller steering angle or even a steering angle in the opposite direction via the steering wheel.

Actuator system 12 also has a brake actuator that is represented here by two subsystems, namely, one brake actuator BL for the left front wheel and/or rear wheel of the vehicle, and a brake actuator BR for the right front wheel and/or rear wheel.

Emergency evasion function 16 breaks down functionally into a planning instance 18, a transverse-dynamics controller CY and a longitudinal-dynamics controller CV. If an emergency evasive maneuver proves to be necessary, planning instance 18 calculates a setpoint evasion trajectory and an associated setpoint velocity profile based on the data supplied by sensory system 10. Transverse-dynamics controller CY then acts on actuator system 12 in such a way that the vehicle is kept to the greatest extent possible on the setpoint evasion trajectory, and longitudinal-dynamics controller CV acts on the braking system (and possibly also the drive system) of the vehicle in such a way that the setpoint velocity profile is observed to the greatest extent possible.

Figure 2A:
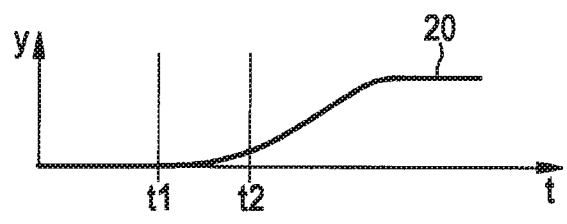
FIGS. 2A and 2B show diagrams of an evasion trajectory and a velocity profile for one example of an emergency evasive maneuver.
Figure 2B:
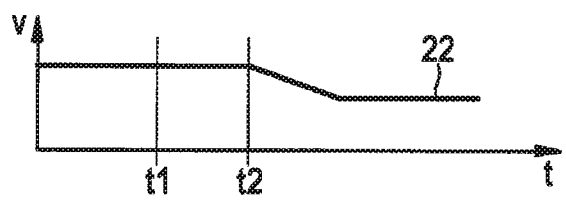

In FIG. 2 (A), a setpoint evasion trajectory is described by a curve 20 that indicates transverse position y of the vehicle as a function of time t. In FIG. 2 (B), the associated setpoint velocity profile is represented by a curve 22 that indicates velocity v (longitudinal velocity) of the vehicle as a function of time t.

In the example shown in FIG. 2, planning instance 18 has calculated a setpoint trajectory on which the vehicle switches to the left adjacent lane. A first phase of the evasive maneuver begins at an instant t1 with an intervention in the steering system. However, no intervention in the longitudinal dynamics takes place as yet in this phase, so that velocity v of the vehicle still remains constant for the moment. Consequently, the vehicle driver perceives only an intervention in the transverse dynamics, and infers from this that the evasion-assist system is attempting to drive around the obstacle. In this example, it should therefore be assumed that the driver is permitting the automatic intervention and is not overriding the emergency evasion function.

Only at a later instant t2 does a second phase of the evasive maneuver then commence in which, while the intervention in the transverse dynamics is continued, an intervention in the longitudinal dynamics in the form of a braking procedure is also carried out, e.g., in order to mitigate the consequences of an accident if, in spite of the evasive maneuver initiated, a collision should occur. Accordingly, velocity v decreases as of instant t2. Finally, the evasive maneuver is concluded with a countersteering movement, the result of which, for example, is that the vehicle continues its travel parallel to the original course in the adjacent lane. In view of the now lower velocity v of the vehicle, the countersteering movement may be implemented with a smaller radius of curve.

In the example shown here, the intervention in the longitudinal dynamics is ended earlier than the intervention in the transverse dynamics, so that the vehicle is already traveling again with a constant velocity during the countersteering movement. However, depending on the traffic situation, it may also occur that the intervention in the transverse dynamics is ended earlier than the intervention in the longitudinal dynamics.

During the entire evasive maneuver, planning instance 18 checks, on the basis of the data supplied by sensory system 10, whether the actual dynamics correspond to the setpoint dynamics calculated, or whether a deviation has come about between the actual dynamics and setpoint dynamics owing to interventions by the vehicle driver or because of other factors. With reference to the actual dynamics, planning instance 18 may also determine instant t2, at which the second phase of the evasive maneuver begins. One criterion for the introduction of the second phase—and therefore the intervention in the longitudinal dynamics—may lie in the fact, for example, that the steering angle, the steering wheel angular velocity, the yaw rate, the yaw angle, transverse position y, the distance traveled in the longitudinal direction of the vehicle, the transverse acceleration, the wheel-speed ratios and/or the time passed since instant t1 has exceeded a suitable threshold value. Optionally, a combination of several such criteria may also be used, which then influence the decision with different weights.

Figure 3A:
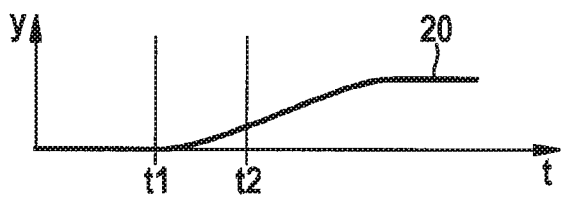
FIGS. 3A and 3B show diagrams of an evasion trajectory and a velocity profile for another example of an emergency evasive maneuver.
Figure 3B:
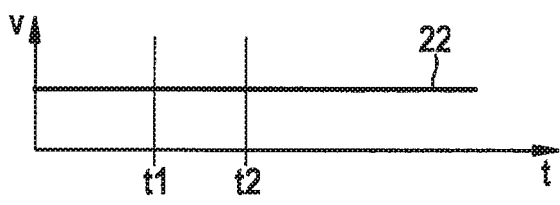

FIG. 3 illustrates an example in which initial velocity v of the vehicle is lower, so that the obstacle may be avoided on an evasion trajectory without a change in velocity. Accordingly, curve 22 in FIG. 3 represents a velocity profile that corresponds to a constant velocity v. If the actual evasion trajectory agrees with the setpoint trajectory, planning instance 18 merely decides at instant t2 (e.g., a fixed time span after instant t1) that no intervention in the longitudinal dynamics is necessary.

Figure 4A:
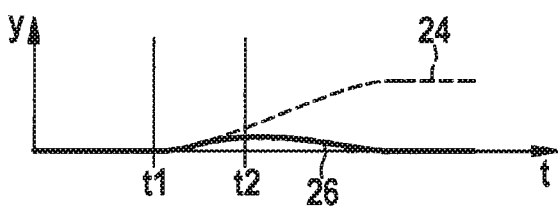
FIGS. 4A and 4B show diagrams of an evasion trajectory and a velocity profile for an aborted emergency evasive maneuver.
Figure 4B:
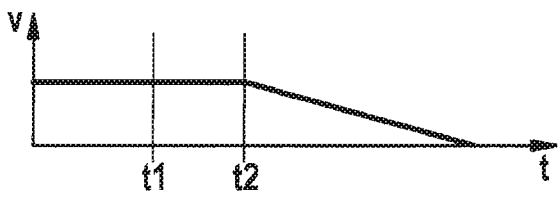

On the other hand, FIG. 4 illustrates an example in which the driver prevents the evasive maneuver by active countersteering. In FIG. 4 (A), the setpoint evasion trajectory calculated by planning instance 18 is represented by a dashed-line curve 24, while the actual trajectory is represented by a curve 26 that deviates from curve 24. Because of the deviation between the actual trajectory and setpoint trajectory, at instant t2, planning instance 18 reevaluates the probability of collision and, contrary to the original planning, decides that an intervention (or a greater intervention)

in the longitudinal dynamics is necessary after all. Accordingly, an emergency braking is triggered at instant t2. At the same time, the intervention in the transverse dynamics may be terminated, if appropriate.

In the same way, situations are also possible in which an originally planned braking maneuver then proves to be unnecessary after all at instant t2, or the originally calculated velocity profile must be modified.

Figure 5:
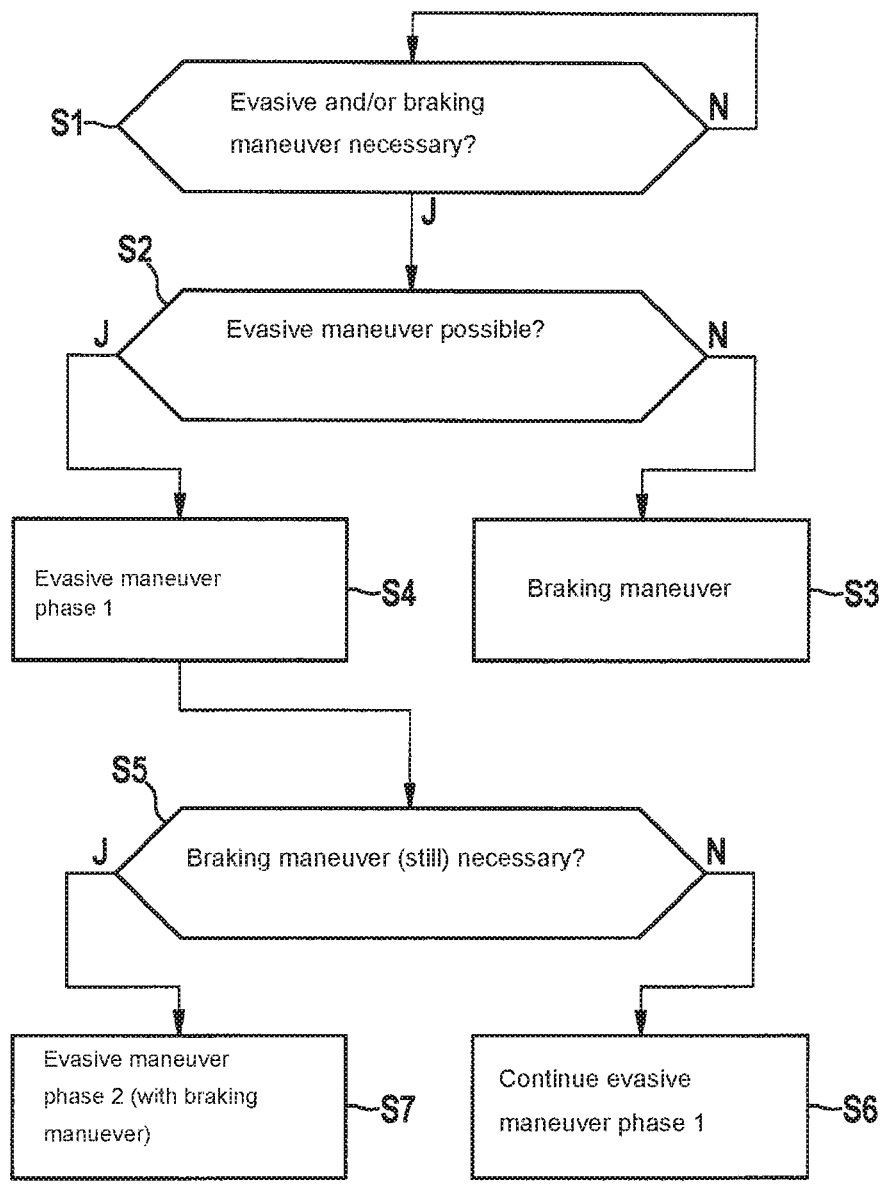
FIG. 5 shows a flow chart for clarifying the invention.

The essential functions of the evasion and brake-assist system described here are illustrated in a flow chart in FIG. 5.

In a step S1, planning instance 18 checks whether there is a critical danger of collision, that is, whether or not an evasive maneuver and/or a braking maneuver is necessary. As long as this is not the case (N), step S1 is repeated cyclically. If there is a danger of collision (J), then with the aid of the data from the sensory system (camera and/or radar sensor), it is checked in step S2 whether an evasive maneuver is possible. If this is not the case (N), e.g., because the adjacent lane is likewise blocked, an emergency braking maneuver is initiated immediately (thus, already at instant t1) in step S3. On the other hand, if an evasive maneuver is possible with intervention in the transverse dynamics, then the first phase of the evasive maneuver is introduced in step S4 at instant t1, that is, an intervention takes place in the transverse dynamics of the vehicle, but still no intervention in the longitudinal dynamics.

At later instant t2, it is then checked in step S5 whether, within the course of the evasive maneuver or instead of it (if the evasive maneuver is aborted), an intervention in the longitudinal dynamics is necessary. If this is not the case (N), in step S6, the evasive maneuver is continued solely with the intervention in the transverse dynamics, as in the exemplified case illustrated in FIG. 3. On the other hand, if an intervention in the longitudinal dynamics is also necessary (J), the second phase of the evasive maneuver begins with step S7 with combined intervention in the transverse dynamics and the longitudinal dynamics. If the driver forces an abandonment of the evasive maneuver (FIG. 4), the intervention in the longitudinal dynamics is continued as an emergency braking maneuver.

At least in the first phase of the evasive maneuver, the intervention in the transverse dynamics of the vehicle does not necessarily have to take place via steering actuator S or active steering system SA. As shown in FIG. 1, transverse-dynamics controller CY may also transmit commands (with different content) to brake actuators BL and BR for the left and right side of the vehicle, to thus intervene in the transverse dynamics by asymmetrical braking. On the other hand, longitudinal-dynamics controller CV always transmits identical commands to brake actuators BL and BR for the two sides of the vehicle and brings about symmetrical brake interventions without (intentional) effect on the transverse dynamics.

What is claimed is:

1. An evasion and brake-assist system for a motor vehicle, comprising:
    a sensory system for sensing a traffic environment of the vehicle;
    an actuator system for providing interventions in a steering system and a brake system of the vehicle; and
    an electronic control device implementing an emergency evasion function that checks whether an emergency evasive maneuver is necessary based on data supplied by the sensory system, and then acts on dynamics of the vehicle via the actuator system to assist a vehicle driver in initiating and/or executing the emergency evasive maneuver, wherein the electronic control device performs a first collision probability determination for the motor vehicle and initiates the emergency maneuver if the first probability determination reaches a specific value;
    wherein in a first phase of the emergency evasive maneuver, the emergency evasion function intervenes exclusively in a transverse dynamics by actuating a steering system of the vehicle and maintaining a braking system of the vehicle in a deactivated state,
    wherein only in a second phase after the first phase, the emergency evasion function makes a decision on whether an intervention in a longitudinal dynamics will also take place,
    wherein in the second phase of the emergency evasive maneuver, the emergency evasion function continues intervening in the transverse dynamics through the actuating of the steering system and initiates the intervention in the longitudinal dynamics while the intervention in the transverse dynamics is continued, the intervention in the longitudinal dynamics including actuating the braking system to produce a symmetrical braking of left and right wheels of the vehicle,
    wherein the electronic control device detects a countersteering by the vehicle driver that acts against the first phase of the emergency evasive maneuver,
    wherein, in response to a detection of the countersteering, the electronic control device performs a second collision probability determination for the vehicle,
    wherein the electronic control device implements the intervention in the longitudinal dynamics in response to the second collision probability determination indicating a need for the intervention in the longitudinal dynamics and
    wherein the second collision probability determination is executed after the first collision probability determination.

2. The evasion and brake-assist system of claim 1, wherein the decision as to whether the intervention in the longitudinal dynamics occurs is made at an instant that is determined by the emergency evasion function on the basis of a threshold-value criterion.

3. The evasion and brake-assist system of claim 2, wherein the threshold-value criterion includes a threshold-value comparison for at least one of the following variables: a steering angle of the vehicle, a steering wheel angular velocity, a yaw rate, a yaw angle, a transverse displacement, a transverse acceleration, a wheel-speed ratio between the left and right wheels of the vehicle, a distance traveled since the beginning of the first phase, and a time passed since the beginning of the first phase.

4. The evasion and brake-assist system of claim 1, wherein at least in the first phase of the emergency evasive maneuver, the intervention in the transverse dynamics includes an asymmetrical braking of the left and right wheels of the vehicle.

5. The evasion and brake-assist system of claim 1, wherein the intervention in the transverse dynamics includes an intervention via an active steering system (SA).

6. The evasion and brake-assist system of claim 1, wherein the intervention in the longitudinal dynamics is ended earlier than the intervention in the transverse dynamics.

7. The evasion and brake-assist system of claim 1, wherein the intervention in the transverse dynamics is ended earlier than the intervention in the longitudinal dynamics.

8. The evasion and brake-assist system of claim 1, wherein the emergency evasive maneuver is ended once the vehicle is determined to be on a trajectory that is in a lane adjacent to an original lane in which the vehicle was traveling prior to a beginning of the emergency evasive maneuver, and that is parallel to an original trajectory in the original lane.

9. The evasion and brake assist system of claim 1, wherein:
   the emergency evasive maneuver is initiated according to a setpoint trajectory determined by the electronic control device, and
   the second phase is initiated if during the first phase of the emergency evasive maneuver a deviation is determined to be present between the setpoint trajectory and an actual trajectory of the vehicle.

* * * * *